United States Patent
Bradshaw et al.

(10) Patent No.: US 10,218,809 B2
(45) Date of Patent: Feb. 26, 2019

(54) DYNAMIC CONFIGURATION OF SERVICE COMMUNICATION

(71) Applicant: Home Box Office, Inc., New York, NY (US)

(72) Inventors: Dexter Paul Bradshaw, Bainbridge Island, WA (US); Jeffrey Stamerjohn, Mercer Island, WA (US); Jinjiang Zeng, Mercer Island, WA (US)

(73) Assignee: HOME BOX OFFICE, INC., New York, NY (US)

( * ) Notice: Subject to any disclaimer, the term of this patent is extended or adjusted under 35 U.S.C. 154(b) by 113 days.

(21) Appl. No.: 15/291,816

(22) Filed: Oct. 12, 2016

(65) Prior Publication Data

US 2017/0104641 A1    Apr. 13, 2017

Related U.S. Application Data

(60) Provisional application No. 62/240,888, filed on Oct. 13, 2015.

(51) Int. Cl.
*H04L 29/08* (2006.01)
*G06T 1/20* (2006.01)
(Continued)

(52) U.S. Cl.
CPC .... *H04L 67/2842* (2013.01); *G06F 17/30864* (2013.01); *G06T 1/20* (2013.01); *G06T 1/60* (2013.01); *G06T 11/206* (2013.01); *H04L 41/5038* (2013.01); *H04L 41/5054* (2013.01); *H04L 43/045* (2013.01); *H04L 43/10* (2013.01); *H04L 65/105* (2013.01); *H04L 67/02* (2013.01); *H04L 67/10* (2013.01); *H04L 67/16* (2013.01); *H04L 67/28* (2013.01);
(Continued)

(58) Field of Classification Search
CPC ...... H04L 67/10; H04L 67/28; H04L 67/2852
See application file for complete search history.

(56) References Cited

U.S. PATENT DOCUMENTS 6,025,837 A    2/2000  Matthews, III et al.
7,349,980 B1*  3/2008  Darugar ............. G06F 17/3089
                                                        709/211
(Continued)

FOREIGN PATENT DOCUMENTS

EP    0848554 A2    6/1998
WO    9713368 A1    4/1997
(Continued)

OTHER PUBLICATIONS

International Search Report and Written Opinion for PCT Application Serial No. PCT/US2016/056755 dated Dec. 19, 2016, 15 pages.

*Primary Examiner* — Lashonda T Jacobs
(74) *Attorney, Agent, or Firm* — Amin, Turocy & Watson, LLP

(57) ABSTRACT

The described technology is generally directed towards a subscriber service using configurable data (e.g., a declarative configuration file) data to make service calls to publisher endpoints. Dynamic reconfiguration of the data changes the service call communication parameters without needing to bring down the subscriber server or its service, and/or without needing to modify/rewrite programs for the reconfiguration.

20 Claims, 11 Drawing Sheets

(51) Int. Cl.
   *G06T 1/60*     (2006.01)
   *G06T 11/20*    (2006.01)
   *H04L 29/06*    (2006.01)
   *H04L 12/24*    (2006.01)
   *H04L 12/26*    (2006.01)
   *H04N 21/25*    (2011.01)
   *H04N 21/433*   (2011.01)
   *H04N 21/482*   (2011.01)
   *G06F 17/30*    (2006.01)
   *H04N 21/43*    (2011.01)

(52) U.S. Cl.
   CPC ...... *H04L 67/2833* (2013.01); *H04L 67/2852* (2013.01); *H04L 67/32* (2013.01); *H04L 67/34* (2013.01); *H04L 67/42* (2013.01); *H04N 21/251* (2013.01); *H04N 21/43* (2013.01); *H04N 21/4332* (2013.01); *H04N 21/4821* (2013.01); *H04N 21/4826* (2013.01)

(56) References Cited

U.S. PATENT DOCUMENTS

| | | | |
|---|---|---|---|
| 7,587,450 B2 * | 9/2009 | Morris | H04L 67/24 709/203 |
| 7,620,653 B1 | 11/2009 | Swartz | |
| 8,566,402 B2 * | 10/2013 | Cullen | G06Q 30/02 709/206 |
| 9,031,995 B1 | 5/2015 | Raden, II et al. | |
| 9,407,513 B2 * | 8/2016 | Shah | H04L 41/0273 |
| 2002/0147856 A1 * | 10/2002 | Sarkar | H04L 29/06 719/313 |
| 2003/0105805 A1 * | 6/2003 | Jorgenson | H04L 29/06 709/203 |
| 2008/0065702 A1 * | 3/2008 | Dickerson | G06F 17/30306 |
| 2010/0322236 A1 * | 12/2010 | Vimpari | H04L 12/1886 370/389 |
| 2013/0166703 A1 * | 6/2013 | Hammer | H04L 41/50 709/220 |
| 2013/0297738 A1 * | 11/2013 | Tarkoma | G06F 17/30958 709/217 |
| 2013/0346539 A1 | 12/2013 | Sivasubramanian et al. | |
| 2014/0040301 A1 | 2/2014 | Chadha et al. | |
| 2014/0181137 A1 | 6/2014 | Stein | |
| 2014/0192717 A1 * | 7/2014 | Liu | H04W 60/00 370/328 |
| 2014/0195645 A1 * | 7/2014 | Cohen | H04L 67/32 709/219 |
| 2016/0203282 A1 * | 7/2016 | Azizian | G06F 19/3481 700/275 |

FOREIGN PATENT DOCUMENTS

| | | |
|---|---|---|
| WO | 2007054687 A1 | 5/2007 |
| WO | 2011102824 A2 | 8/2011 |

\* cited by examiner

DYNAMIC CONFIGURATION OF SERVICE COMMUNICATION

CROSS-REFERENCE TO RELATED APPLICATION

The present application claims priority to U.S. provisional patent application Ser. No. 62/240,888, filed Oct. 13, 2015.

BACKGROUND

In distributed computing systems, a service subscriber comprises a service/network application that wants to use another service, referred to as a service publisher, that exports some functionality desired by the service subscriber. Service discovery in large-scale distributed systems is generally directed towards matching a subscribing service to the correct version of a published service.

To facilitate discovery, the service publisher may publish relevant information including its functionality and version in a service repository or (registry). Alternatively, a subscriber may poll existing services or some well-known service for the targeted endpoint. The service repository mainly comprises a dynamic, highly-available, distributed associative database that stores metadata about healthy, available published services. Once a publisher is discovered by a subscriber, the services interact with each other's APIs via endpoints. Endpoint resolution refers to the process of mapping a service name to a compatible endpoint using the associative database in the repository, which is followed by binding to the endpoint and endpoint activation.

In most modern scenarios, the repository database is relatively static, comprising a write-once, read-many database that is batch loaded infrequently but read from heavily. In a large distributed system on the order of hundreds of thousands of service instances, services tend to fail relatively often. Moreover, the set of available publisher server instances may be intentionally changed, such as due to auto-scaling policies by the distributed infrastructure. The infrastructure may scale instances up or down due to proportionate workload increases and decreases, respectively. As a result, services tend to be constantly deployed, redeployed or rolled back, and both ephemeral and persistent network partitions are common.

In such an environment, static or near-static repositories tend to represent the state of the services in the distributed system in the past. Endpoint mappings in the repository may be stale, leading to false positives during endpoint resolution, (where endpoint resolution refers to the process of mapping a service name to a compatible endpoint using the associative database in the repository). Such false positives lead to connection failure, retries, and more cascading failures, further increasing the entropy and network load in the distributed system.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards using configuration information to communicate between a proxy server and a publisher service, in which the proxy server is coupled to a subscriber service to communicate on behalf of the subscriber service. Upon detecting a state change related to the publisher service, in which the state change is indicated in a repository, the configuration information is changed dynamically and in real time into modified configuration information, based upon the state change. The modified configuration information is used to communicate between the proxy server and the publisher service, in which the changes occur without modification to code of the publisher service or code of the subscriber service.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards subscriber service-to-publisher service communication and related operations. As will be understood, the technology described herein makes software subscriber services remain available when changes are needed. In general, the technology provides a way for changes to be fast and happen in real-time, so the effects of configuration changes are seen virtually immediately.

In one or more implementations, configuration changes may be scaled to tens of thousands of subscribers and publishers. This is achieved by using a highly available key-value store or other suitable data store, which can scale the number of connections, monitored watches, reads, and transactional updates. Moreover, the components are highly available without any single points of failure.

It should be understood that any of the examples herein are non-limiting. For instance, some of the examples refer to a proxy server/load balancer having certain features. However, the technology described herein is independent of any particular proxy server/load balancer, and any suitable such component or set of components may be used, including a custom-written component. Thus, any of the embodiments, aspects, concepts, structures, functionalities or examples described herein are non-limiting, and the technology may be used in various ways that provide benefits and advantages in data communication and data processing in general.

Figure 1:
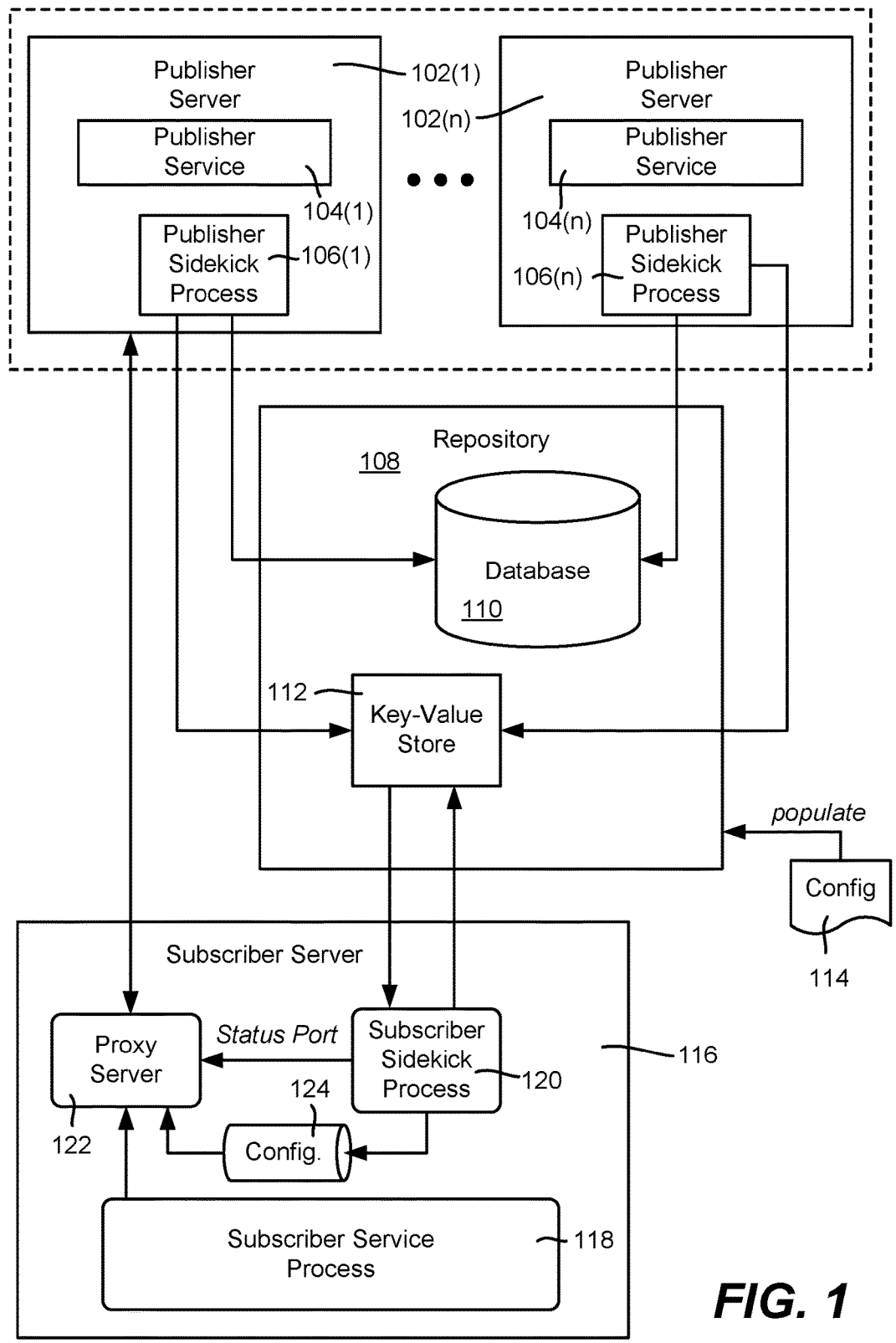
FIG. 1 is an example block diagram representation of a publisher service/subscriber service environment in which communication may be modified based upon changes to reconfigurable data as monitored by a subscriber sidekick process, according to one or more example implementations.

As generally represented in the example implementation of FIG. 1, the exemplified publisher servers 102(1)-102(n), each include a publisher service that exports some service functionality, shown as publisher services 104(1)-104(n), respectively. In a typical scenario, there may be thousands of publisher services (and thousands of subscriber services). Services can fail fast, and may be ephemeral, volatile and/or dynamic. Servers and/or services may be co-tenanted on the same virtual machine and/or physical machine; note that a virtual machine may or may not be the smallest unit of deployment, as there may be processes, threads, co-routines, containers and so on. Multiple instances of multiple versions of a service may be running concurrently. There may be multi-datacenter and cross-regional access to deployed services. In one or more implementations rapid deployment is available to support automatic scaling to react to workload peaks, along with integrated load-balancing across service instances.

As described herein, each publisher server 102(1)-102(n) includes a publisher service registration component that runs as a publisher sidekick process, shown as 106(1)-106(n), respectively. Each of the publisher sidekick processes 106(1)-106(n which provides for service registration to a repository 108, as well as performing other operations as described herein.

In general, the repository 108 is a highly-available, distributed repository including a database 110 that maintains the publisher services' registrations. As described herein, the repository 108 also includes or is coupled to a service registry comprising a key-value store 112, (or multiple key-value stores), which may be monitored for changes related to the registered publisher services 104(1)-104(n).

Figure 2:
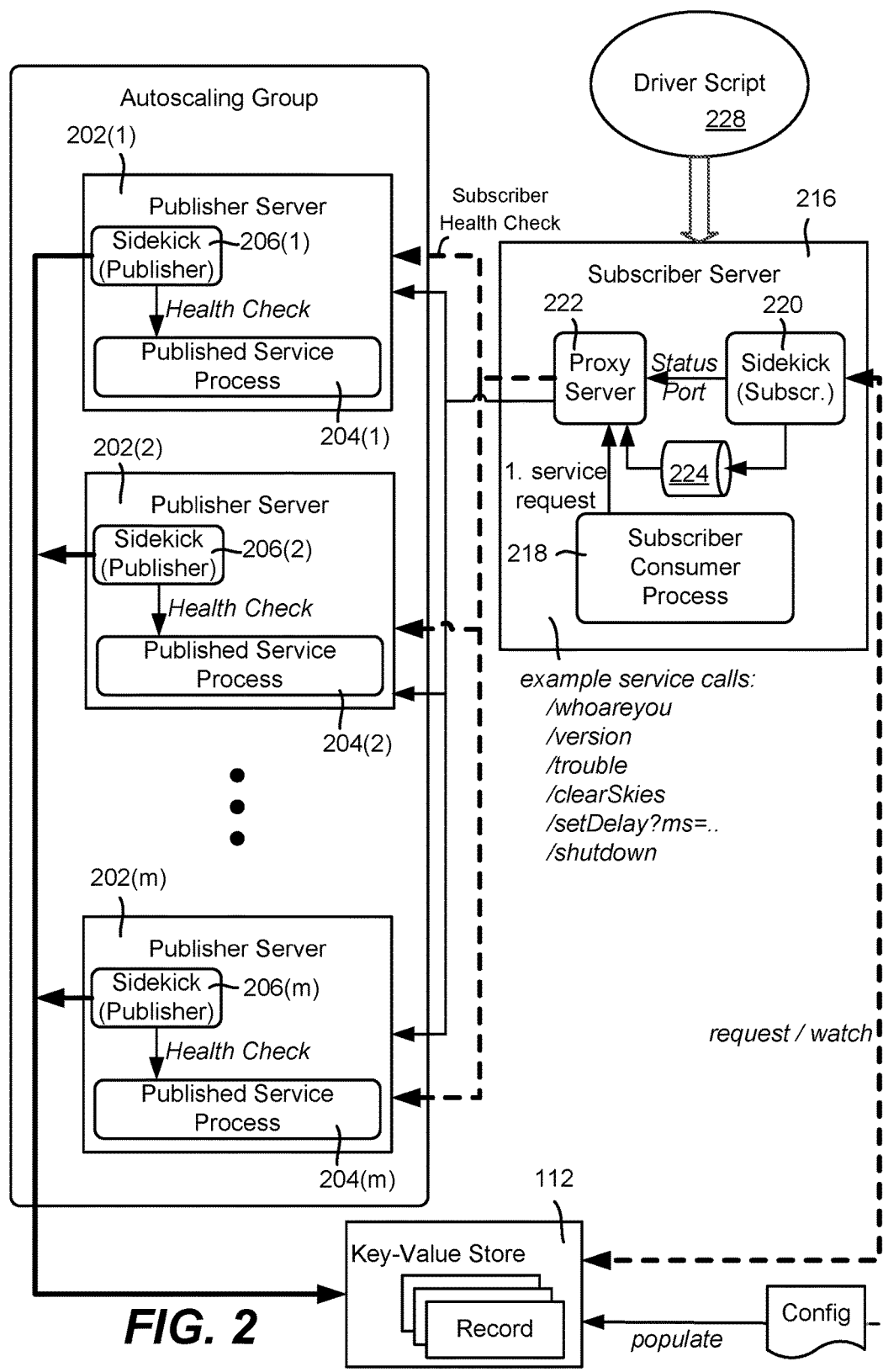
FIG. 2 is an example block diagram representation of a publisher service/subscriber service environment in which communication may be modified based upon changes to reconfigurable data in a key-value store, according to one or more example implementations.

FIG. 2 is an example of a set of publisher servers 202(1)-202(m) arranged as a group 226. For example, a set of Amazon® Web Services (AWS®) AutoScaling servers/services may be considered a group. In general, the numbered components labeled 1xx in FIG. 1 correspond to those labeled 2xx in FIG. 2, and are not described again for purposes of brevity, except to note that a driver script 228 may control at least some operation of the subscriber server 216 (and/or its components), some possible service calls are exemplified, and that the key-value store 212 contains a set of records, with each record containing the value for the key.

Figure 3:
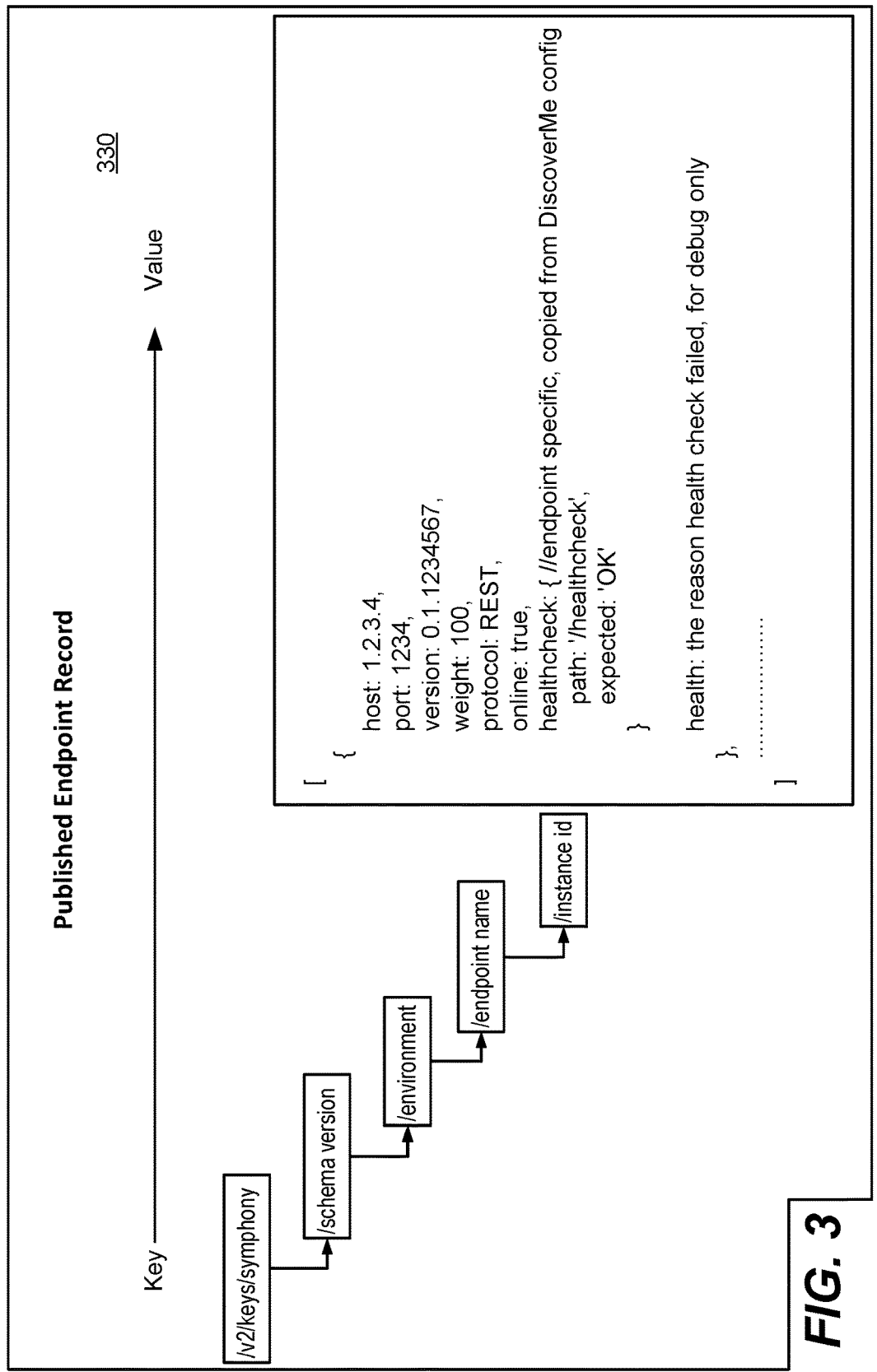
FIG. 3 is an example representation of how configurable data may be maintained in a key-value store that may be monitored for changes, according to one or more example implementations.

With respect to records in the key-value store, in one or more implementations, the service metadata schema of the key-value store data structures (e.g., records) is generalized and normalized. The records are written by the publisher sidekick process, e.g., the process 206(1) of FIG. 2. The publisher sidekick process creates key value entries for service endpoints on a given node in the repository, such as shown in the example published record 330 of FIG. 3; (where "DiscoverMe" in the record 330 is a general name for the publisher sidekick process).

In general, health checks ensure that only healthy services can publish an endpoint and only healthy services remain registered in the repository as available, that is, subscribers only see healthy services and do not discover unhealthy services. To this end, unhealthy services may remain in the registry but they are marked as unhealthy, and thus never called. Service registrations have a time-to-live (TTL) where they are allowed to remain in the registry for that period of time even though they are unhealthy, as this saves the overhead of rewriting configuration files and writing to the repository; this also helps in analytics and statistics (metric) gathering and debugging failures.

Returning to FIG. 1, the database 108 may be updated by the publisher sidekick processes 106(1)-106(n). The repository 108 including the database 110 and key-value store 112 also may be configured/updated/populated by an external configuration source 114, such as an administrator, automated process, and so on.

FIG. 1 also shows a subscriber server 116 including a subscriber service process 118, subscriber sidekick process 120 and proxy server 122. As described herein, the subscriber service process 118 makes service calls through a proxy server 122, which uses a configuration file 124 (and/or other suitable data structure, including in-memory accesses by the proxy server) to communicate with a discovered publisher service, exemplified in FIG. 1 as the publisher service 104(1).

Note that the technology described herein allows a service publisher to be a subscriber to other services, and vice versa. This allows chained service-to-service calls, e.g., where Service A calls Service B which calls Service C which calls Service D and so on.

Service discovery in the environment exemplified in FIG. 1 generally follows the service discovery pattern for modern distributed architectures. However, as will be understood, the publisher sidekick process (e.g., 106(1)) provides for enhanced generic service registration while the subscriber sidekick process 120 provides for enhanced service discovery. The publisher sidekick process (e.g., 106(1)) and the subscriber sidekick process 120 also participate in health checking, which in general removes unhealthy and/or non-communicating publisher services from the system. The repository 108 handles service discovery out-of-band of the application. Service discovery components run locally on the machine at well-known ports. Service discovery may be abstracted away, with no need to find discovery service publisher bindings.

Figure 4:
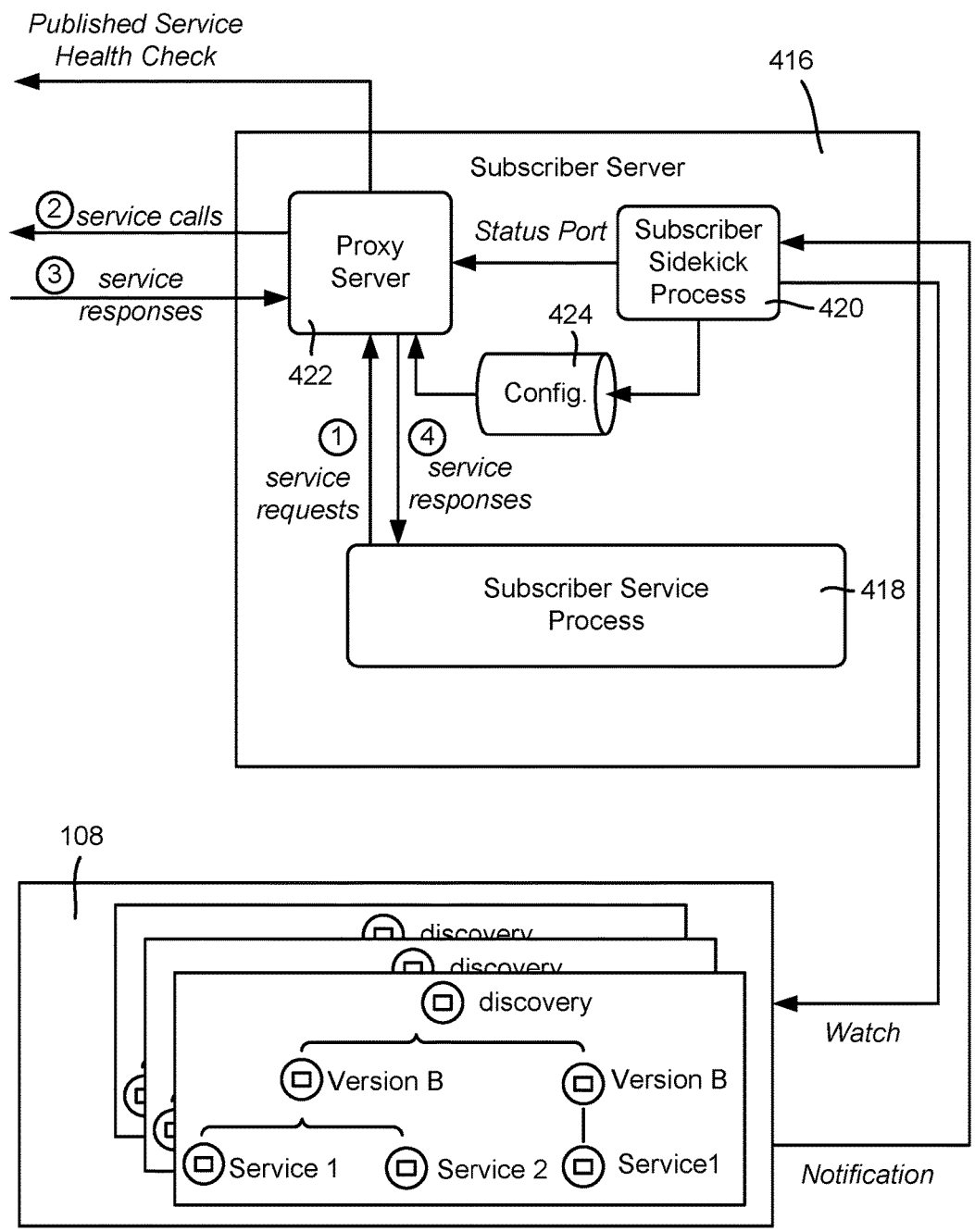
FIG. 4 is an example block diagram representation of a subscriber server along with its components configured to communicate with a publisher service via configurable data, and conduct health checks on the subscriber service, according to one or more example implementations.

Turning to an example subscriber server 416 of FIG. 4, in one or more aspects, the information including communication parameters that a subscriber service process 418 uses to communicate with a publisher service is maintained in a configuration data structure such as a file 424. The communication is indirect, through a proxy server 422. In general, the subscriber service process 418 makes its service requests (arrow one (1)) to the proxy server 422, which makes corresponding service calls (arrow two (2)) to a discovered published service. For each call, the response message (arrow three (3)) is returned from the proxy server 422 to the subscriber service process 418 (arrow four (4)).

In one aspect, the proxy server uses the configuration file 424 for its communication parameter data; (although a file is exemplified herein, it is understood that such information may be maintained in any suitable data structure). The configuration file 424 can be dynamically updated and/or replaced, whereby communication parameters can change (e.g., to a different service version, different protocol and so on) in a way that is transparent to the subscriber server process 418. Further, updates to configuration changes can be made in-memory to the proxy server via a status port in real time. These changes are extremely fast in real time and avoid the relatively slow process of writing a configuration file or restarting the proxy server. Configuration files only need to be re-read when services come and go. Re-reading configuration files usually requires proxy service restarts. As a result, changes may be made dynamically, without needing to bring down the subscriber server 416, subscriber service process 418 and/or proxy server 422.

Non-limiting examples of a suitable proxy server 422, include Nginx or HAProxy, an open source proxy/client side load balancer for web applications. The proxy server 422 uses parameter data set forth in the configuration file 424 for making corresponding service calls to a publisher service. For example, the configuration file may contain various parameter data such as service endpoint name or IP address, API version supported, port, protocol, timeout limits, health check interval, and so on.

In general, such proxy servers provide reverse proxy capabilities while also load balancing requests across multiple instances of a published service, based on a load balancing policy. As can be seen, the load balancing is done in the subscribing service, that is, client side load balancing is performed. Client-side load balancing provides for scalable load balancing, in that server workloads are distributed across subscribers, and is decentralized, whereby there is no single-point of failure and is therefore potentially highly available. Further, note that if used, HAProxy is capable of performing both Transport level (Layer 4) and Application level (Layer 7) load balancing.

The data underlying the configuration file's data, maintained in the key-value store, is monitored for changes, by the sidekick process 420 of the subscriber service process 418. To this end, the sidekick process 420 registers with the repository 108 for change notifications relevant to that subscriber service's counterpart publisher service. The sidekick process 420 thus provides for out-of-band monitoring, change, and notification, without involving the participation of either the publisher or subscriber service process 418.

For example, once registered to watch for changes, any change made to the relevant data in the key-value store results in a notification sent to the sidekick process 420. Note that watches and notifications can be implemented as explicit event messaging or via a mechanism referred to as long polls. Note further that the change may be made by the publisher sidekick process (e.g., a modified heath check interval written to the key-value record), or an administrator operation or the like (e.g., to instruct the subscriber sidekick process to use a different publisher version).

Upon a change and received notification, the sidekick process modifies (or uploads) the configuration file 424 to include the changes. The proxy server 422 transparently starts using the modified data for any subsequent service calls. Such changes are fast (on the order of sub-seconds) and in real-time, so that any change to the system configuration has a virtually immediate effect, without needing code rewrites or bringing down either the publisher or subscriber service process 418.

Configuration changes are extremely fast because the changes may be made in-memory via a status port, and can be made without any downtime to the proxy server or without rewrites of the configuration files. The only time the proxy server needs to be started is if the configuration file has to be rewritten or refreshed due to the creation of a new publisher service instance or the removal of an unhealthy instance.

As a result, the technology described herein is able to deal with problematic changes in the states of services in near real time for a large-scale distributed system. The technology includes continuous integration/continuous deployment (CI/CD) and real-time updates, by loosely coupling the service repository with a CI/CD pipeline. Whenever a new service is deployed into an operating environment, the pipeline updates the service repository with the service discovery publisher and subscriber components of a manifest for that service. Furthermore, an interactive user or administrator can potentially update the repository database to propagate any global changes to the state of the services in the system.

To summarize, the technology may maintain an outstanding long poll on the service registry, or use explicit eventing. This way, any updates to the instance record in the service registry by an interactive user or the CI/CD pipeline causes an update notification on the subscriber sidekick process. The asynchronous notification triggers the subscriber sidekick process to reread the configuration data from the service repository and update the mapping records for the published instance in the repository. Scaling the number of watches, the batch size and throughput of repository reads and transactional writes determines the scale of distributed services recovery, and determines whether publishers/subscribers on the order of tens to tens of thousands can be supported.

The subscriber sidekick process 520 maintains watches on the repository 108 to monitor changes, and uses repository data to make changes to proxy server configuration files, e.g., the file 524. A local proxy server 522 takes care of properly routing the request, e.g., via load balancing policy. The proxy server 522 provides dynamic reconfiguration because of its use of the configuration file 524 for its communication parameter data and because it may also record certain changes on its status port. The changes can be made without any downtime to the proxy server or rewrites of the proxy server's configuration files. The only time the proxy server needs to be started is if the configuration file has to be rewritten or refreshed due to the creation of a new publisher service instance or the removal of an unhealthy instance. For new provider services, the proxy server configuration file is updated. If the proxy server is restarted, the proxy server re-reads the configuration file.

Figure 5:
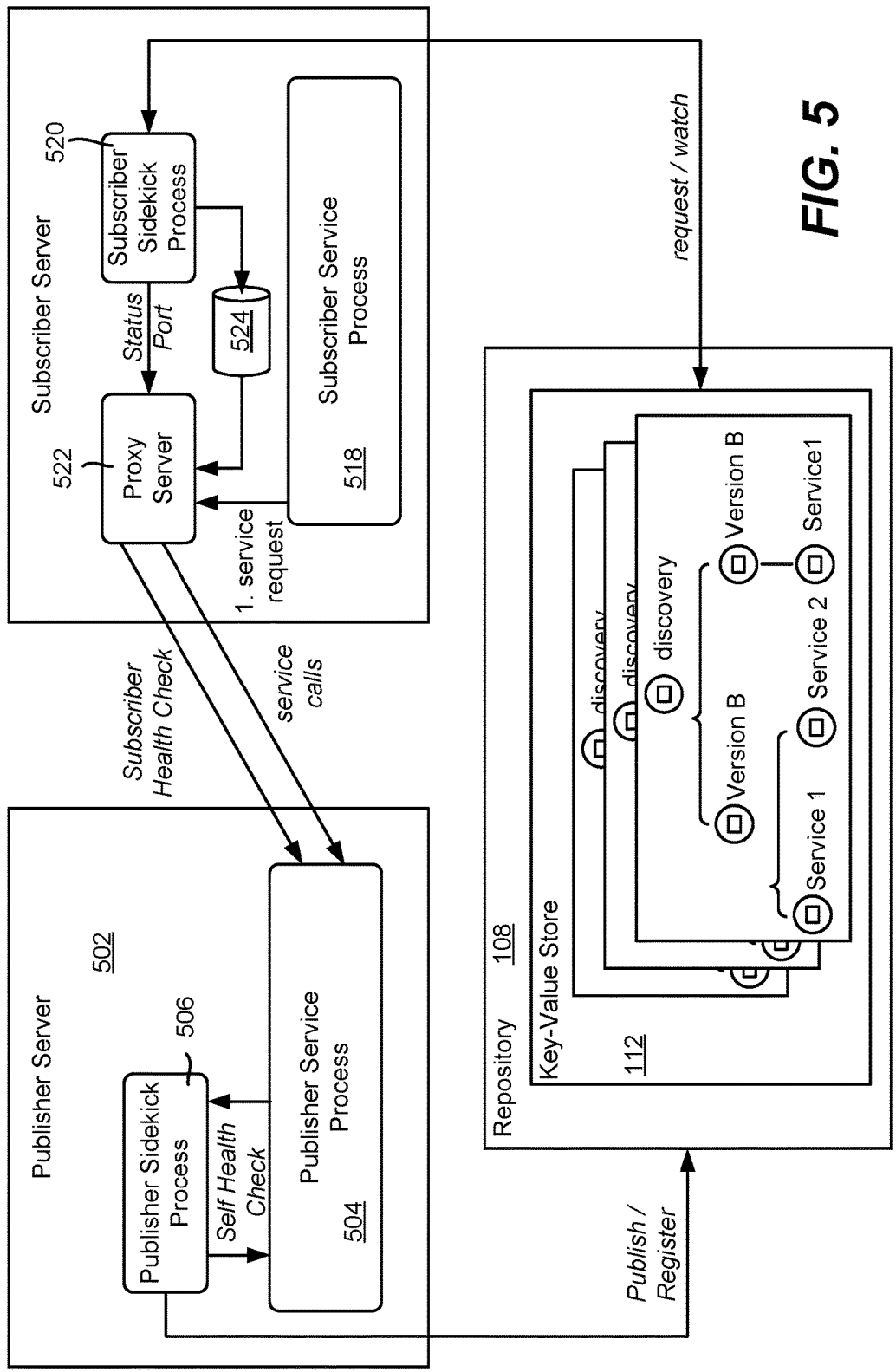
FIG. 5 is an example block diagram representation of a subscriber server along with its components configured to communicate with a publisher service and its components via configurable data, and conduct health checks on the subscriber service, according to one or more example implementations.

With respect to the subscriber sidekick and health checks, as generally represented in FIG. 5, the subscriber service process 518 is deployed with the co-located subscriber sidekick process 520 and the local load balancer (proxy server 522). Note that the subscriber services are deployed with a collocated subscriber sidekick process and a local load balancer/proxy server. If the node hosting these processes goes down, then these three processes go down together.

The subscriber sidekick process 520 reads the published mappings for the healthy instances of the services to which it subscribes and writes a configuration file 524 that is read by the local load balancer/proxy server 522. The load balancer distributes requests according to some loading policy across healthy publisher nodes; (published service health is determined both by health checks from the proxy server 522 on the subscriber side and the publisher side sidekick service 506, which performs a self-health check. The load balancer (directly or via the subscriber sidekick process) periodically sends health check requests to each published instance of the service. If an instance is unhealthy, the instance is removed from the load balancer rotation until it receives a series of successful health checks, e.g., maintained in a per-instance series counter or the like. For existing published services, service providers may be put into maintenance mode or the like (e.g., via the HAProxy stats socket) when they go down; the proxy server 522 can use the stats socket to determine when a provider service returns and reinstate it.

In addition to the initial publication, the publisher sidekick performs a periodic health check on the published service instance to ensure the instance is healthy. Any change in health of the service is recorded in the service repository mapping for the published instance. Only healthy instance of services can be discovered. The period of health check determines the window in which a failed service can go unnoticed. The period of a health check can be configured to sub-second intervals if needed, but may be gated by the health check overhead on the service.

The load balancer or the subscriber sidekick periodically sends health check requests to each published instance of the service. If an instance is unhealthy, the instance is removed from the load balancer rotation until it receives a series of successful health checks. This health check is redundant and decoupled from the publisher health check, generally because the subscriber health check uses the same network route as normal requests whereby it is able to determine not only the health of the service, but the health of the network between the subscribing and publishing instance. This feature allows the detection of network partitions. Further, the period of the health check at the subscriber instance is decoupled from the period of the health check at the publisher instance. Note that in one or more implementations, the health check frequency at both the publisher and subscriber are each separately configurable and are themselves parameters in the configuration file. This can be as granular as needed and provides a means for letting the load balancer detect published service failures independent of the propagation delay of going to the service repository.

Figure 6:
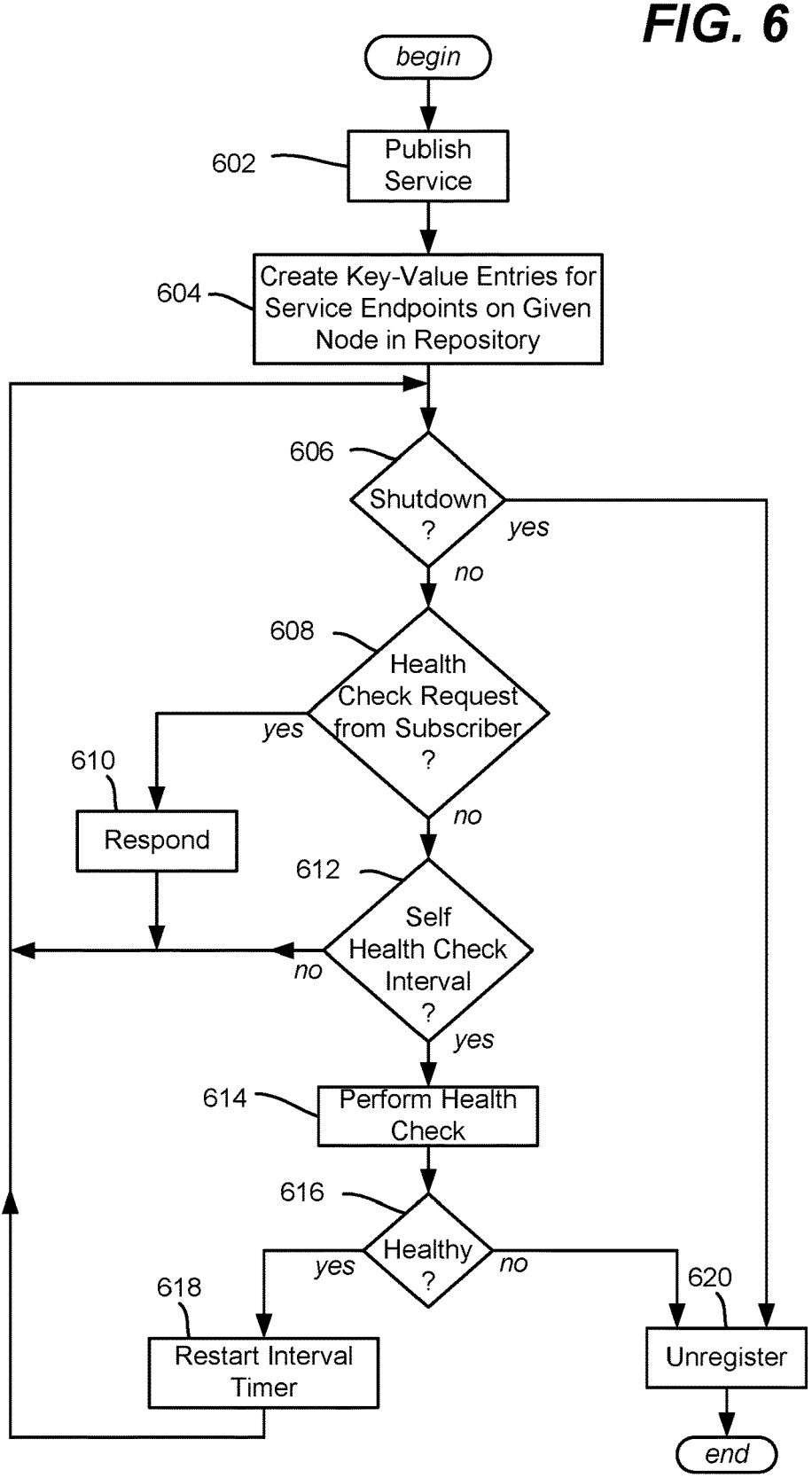
FIG. 6 is a flow diagram showing example steps that may be taken by a sidekick process of a publisher service, according to one or more example implementations.

Turning to examples of various operations, FIG. 6 is a flow diagram showing example steps that may be taken by a publisher sidekick process, beginning at step 602 where the publisher sidekick process publishes a service as available in the repository. Step 604 creates key-value entries for the service as described herein. Note that any of the "loops" shown in FIG. 6 (and indeed in any of the flow diagrams) are only for explanation, and any operation may actually be triggered by an event.

As set forth above, a published service may be shut down at any time, such as by autoscaling operations, e.g., when demand is reduced. Step 606 represents monitoring for such a shutdown, and if taking place, branches to step 620 to unregister the service from the environment.

Steps 608 and 610 represent the publisher sidekick process handling a request for a health check, e.g., from a subscriber's proxy server. If the publisher is healthy, it responds accordingly. Note that no response is generally an indication of unhealthy, whether because the service is not operating properly (if at all) or because of network problems no request is received.

Step 612 represents triggering of the publisher's self-health check interval. When time to perform the self-health check, step 614 is performed. If healthy, the interval is restarted at step 618. Otherwise, the sidekick process takes steps to unregister the published service at step 620.

Figure 7:
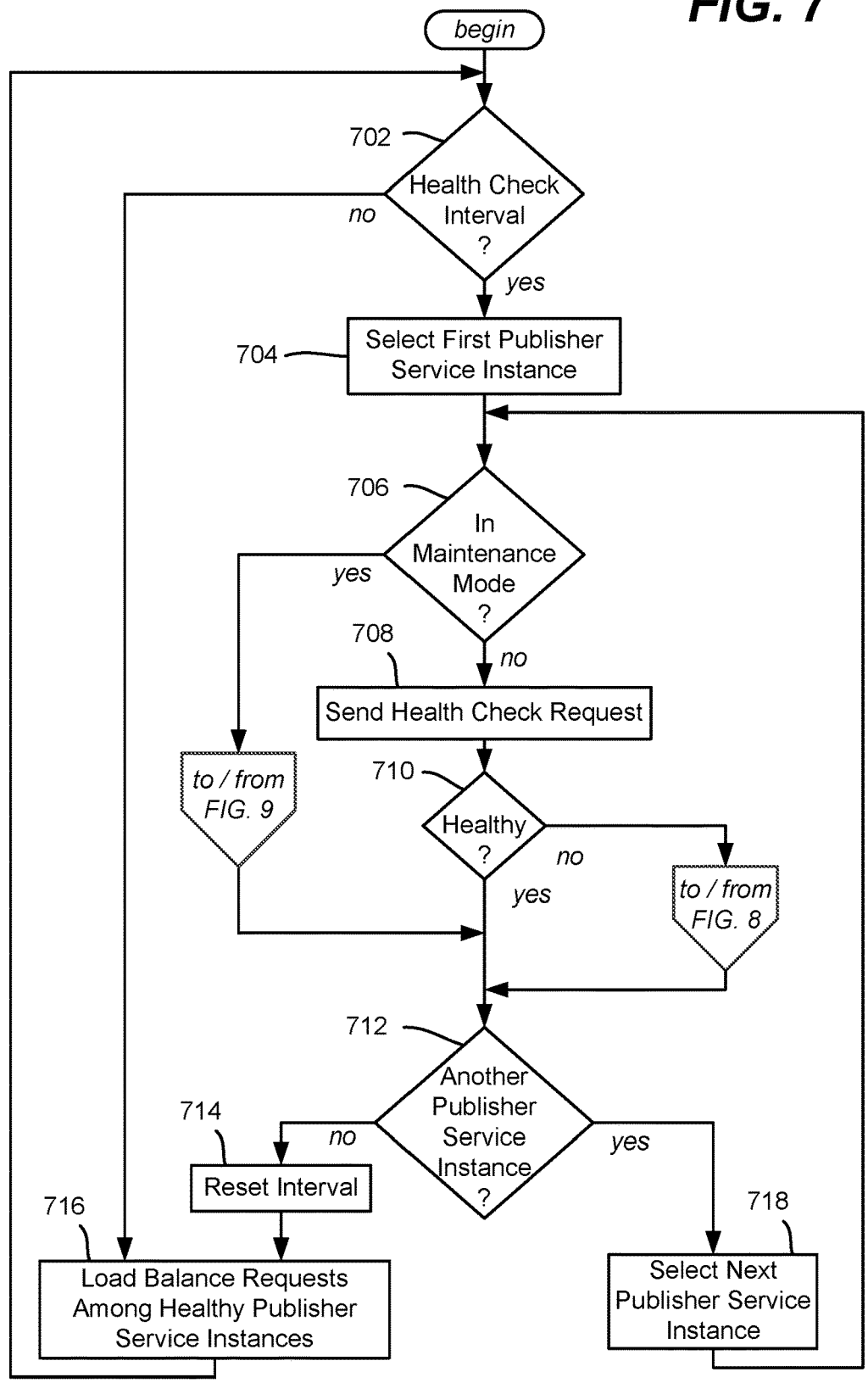
FIGS. 7-9 comprise a flow diagram showing example steps that may be taken by a proxy server/load balancer of a subscriber service, e.g., as directed by a subscriber sidekick process, according to one or more example implementations.

FIG. 7 represents example operations related to a subscriber, e.g., the load balancer/proxy server. Step 702 represents checking if the heath check of the publisher interval has been reached; (the proxy server may perform the interval checking or the sidekick process may perform the interval checking and notify the proxy server). If not time, the proxy server continues to load balance requests among healthy publisher service instances as represented by step 716.

When a health check is needed based upon the configurable interval, step 704 selects a first service publisher instance and step 706 checks whether that service publisher instance is already in the maintenance mode. If so, the process continues to FIG. 8, as described below. If not, step 708 sends a health check request to the service publisher instance. If a healthy response is not received, e.g., in a timely manner, step 710 branches to FIG. 8, as described below.

As seen in FIG. 7, steps 712 and 718 repeat the health checking of each publisher service instance. When none remain to health check, step 714 resets the interval, and step 716 returns to load balance requests among healthy publisher service instances; (note that step 716 may be taking place in parallel, at least in part, with health checking operations).

Figure 8:
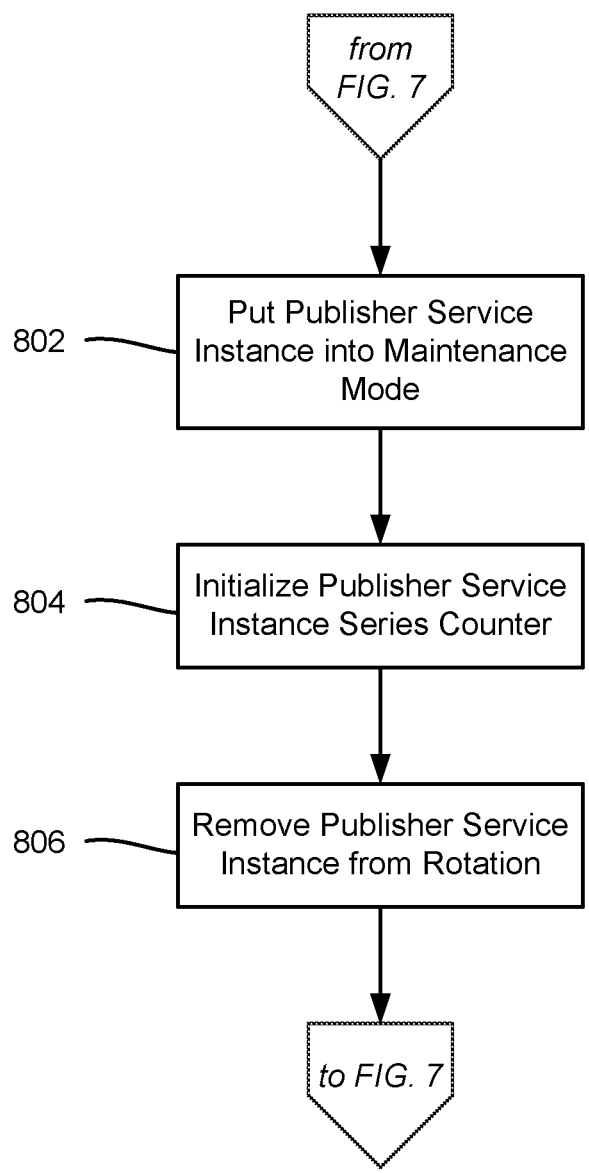

As set forth above, the example steps of FIG. 8 may performed when a publisher service instance fails a health check. Step 802 puts the publisher service instance into maintenance mode (e.g., for HAProxy load balancers). Step 804 initializes the publisher service instance series counter, so that, for example, a publisher service instance that passes a subsequent series of health checks may be put back into the load balancer's rotation. Step 806 removes that publisher service instance from the load balancing rotation.

Figure 9:
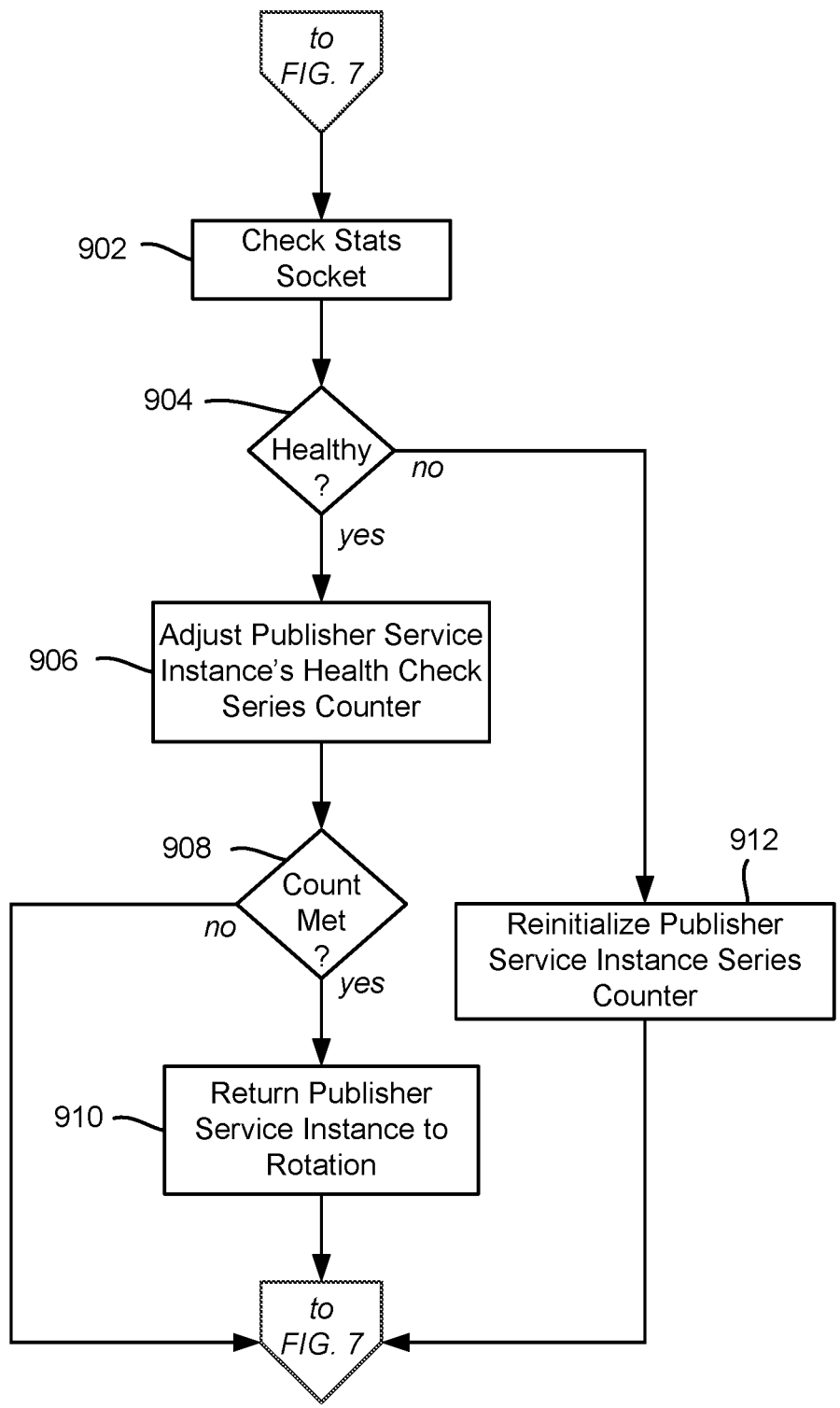

As also set forth above, the example steps of FIG. 9 may be performed when a publisher service instance has previously failed a health check and is in maintenance mode. Step 902 checks for health via the status port (stats socket for HAProxy load balancers). If healthy as evaluated at step 904, step 906 adjusts the publisher service instance's health check series counter, (e.g., decrement from a starting value to zero, or increment from zero to a success count). If not healthy, step 912 reinitializes the series counter to start over, if needed, so that a service instance is not returned until a series of health checks are passed.

If healthy, step 908 evaluates whether the series count has been met. If so, the publisher service instance is returned to the rotation. Otherwise, the series count is changed so that the next health check and so on, if successful, eventually return the publisher service instance series to the rotation. Note that if too many unhealthy checks occur in a row for a publisher service instance in maintenance mode, the publisher service instance can be removed more permanently from the rotation so that no further checking of the stats socket need be performed.

Figure 10:
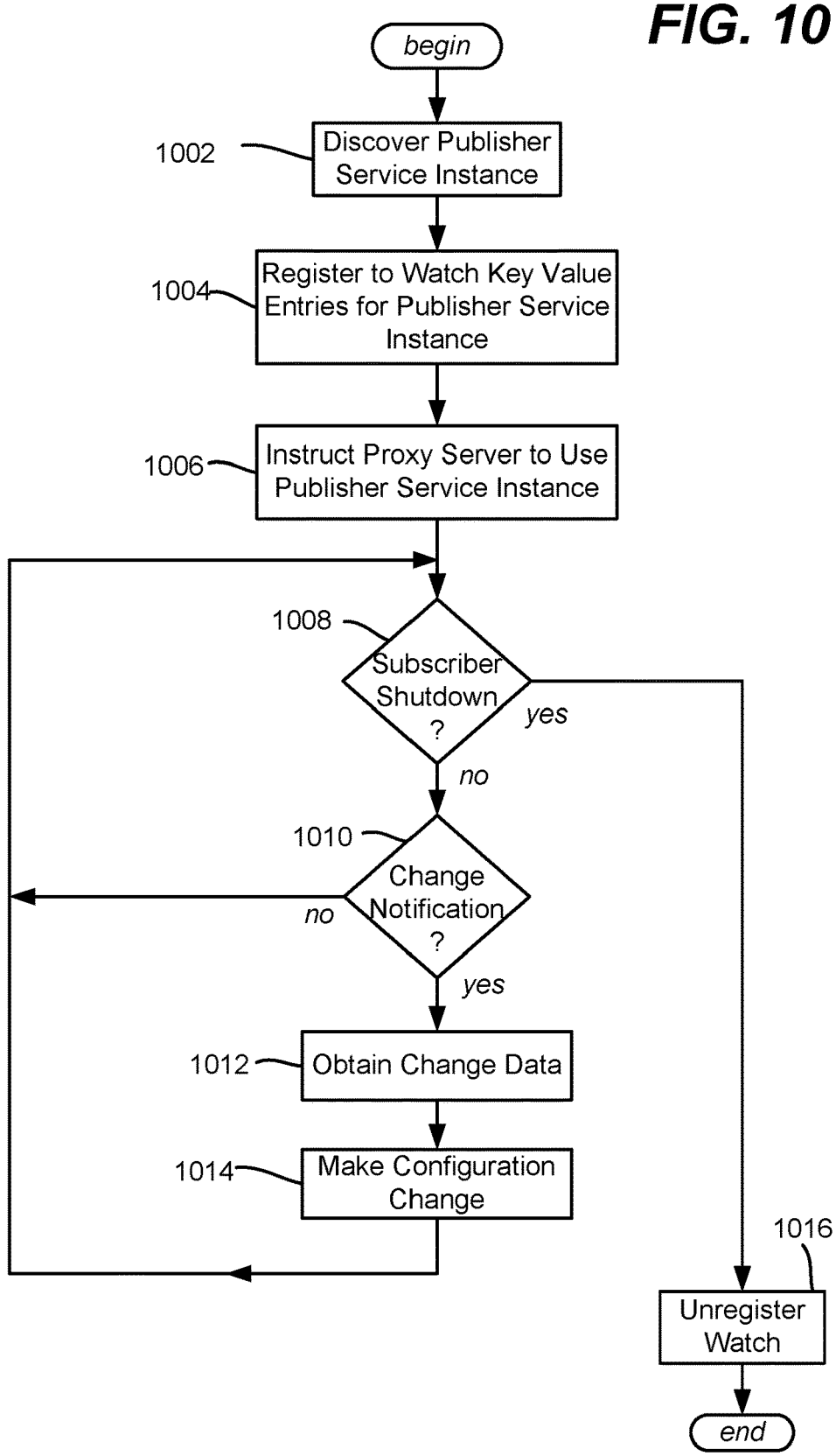
FIG. 10 is a flow diagram showing example steps that may be taken by a sidekick process of a subscriber service, according to one or more example implementations.

FIG. 10 is a flow diagram showing example steps that may be taken by a subscriber sidekick process, beginning at step 1002 where a publisher instance is discovered. Step 1004 represents registering to watch for configuration data changes relevant to the publisher service instance. Step 1006 represents instructing the proxy server to begin using the instance, e.g., adding it to the load balancing rotation.

Step 1008 represents detecting shutdown of the subscriber. If this occurs, the watch may be canceled at step 1016.

Step 1010 represents evaluation for a change notification, which in one or more implementations is an event/notification (rather than a "branch/loop" from step 1010). If a change occurred, step 1012 represents obtaining the change data, (which may be a separate read operation, or may be included as part of the notification). Step 1014 makes the configuration change, which the proxy server/load balancer begins using as described herein.

As can be seen, one or more implementations are exemplified herein in which a configuration file is used to control service-to-service communication and related operations; the configuration file may be dynamically updated to change the service's communication configuration parameters without stopping the service or the server on which it runs. The configuration file is declarative (not programmatic) and induces configuration changes without any modification to the running code on either the publisher or subscriber.

A subscriber service process running in a subscriber server makes service requests to a proxy server also running in the subscriber server. The proxy server in turn makes corresponding service calls to one or more discovered publisher services and load balances across them according to any configured load balancing policy. Instead of the subscriber service making calls via a static configuration, the proxy server is configured to use data maintained in a configuration file to make the subscriber service's calls; e.g., to an endpoint of a discovered publisher service that meets specified API needs. If a change is desired, such as to a different version/endpoint of a publisher service, the change is made in a monitored data store (e.g., to a key-value pair therein), which causes a notification to a sidekick process running in the subscriber server. The sidekick process obtains the notification and changes the configuration file and/or notifies the proxy server on its status port, upon which the proxy server changes to the different parameters (e.g., version/endpoint) for its service calls. The change occurs transparently and out-of-band to the subscriber server, subscriber service process and proxy, and without needing to take down any entity for reconfiguration.

A requesting entity may ask for a service by some suitable (e.g., well-known) identity and version number. Entities may access multiple versions of a provider server concurrently. Service consumers are agnostic to configurations and instance changes to provider instances; (note that "providers" and "publishers", as well as "consumers" and "subscribers" are used interchangeably herein). Load is intelligently and dynamically distributed across service providers. Services that are running may be queried so as to debug and code against services currently running. Service registration/discovery is consistent in the presence of network partitions. Published services come and go without affecting the availability and operationality of the distributed applications they serve.

As also described herein, configurations are dynamic and changes happen in real-time, including via batch updates on a CI/CD pipeline or interactive updates via some user interface. Configuration changes can be continuous to allow for continuous organic change to the distributed system. Configuration changes are propagated quickly throughout the distributed system. Subscribers typically have an up-to-date view of the published services available to them. Although the state of available/unavailable services is eventually consistent it is near strongly consistent. Dynamic changes are made without modification to publisher and subscriber code and without restarting any process participating in service discovery (other than the occasional exception of the proxy server). Changes to the distributed system via service configurations are declarative and not programmatic.

One or more aspects are directed towards using configuration information to communicate between a proxy server and a publisher service, in which the proxy server is coupled to a subscriber service to communicate on behalf of the subscriber service. Upon detecting a state change related to the publisher service, in which the state change is indicated in a repository, described is changing the configuration information dynamically and in real time, based upon the state change, into modified configuration information. Aspects include using the modified configuration information to communicate between the proxy server and the publisher service, in which the changes occur without modification to code of the publisher service or code of the subscriber service.

Changing the configuration information may include communicating with the proxy service via a status port, and without restarting any subscriber service process or publisher service process.

Aspects may include propagating the configuration changes dynamically and in real time via the repository to modify the configuration information of at least one other subscriber service.

Detecting the state change may include monitoring the repository and receiving a notification corresponding to the state change. Monitoring the repository may include using event messaging or long polling. Monitoring the repository may include watching a key-value store coupled to or incorporated into the repository.

Detecting the state change related to the publisher service may include running a subscriber sidekick process co-located with the subscriber service in a subscriber server, including communicating between the subscriber sidekick process and the repository in an out-of-band communication relative to the proxy server communication with the subscriber service.

Aspects may include performing a health check of one or more publisher service instances of the publisher service, and removing any publisher service instance that fails the heath check from a load balancer rotation of the one or more instances. This may include changing any publisher service instance that fails the heath check into a maintenance mode.

One or more aspects are directed towards a subscriber service process, and a proxy server coupled to the subscriber service process, in which the proxy server is configured to communicate with a publisher service instance using communication parameter data in a configuration data structure. A subscriber sidekick process changes the communication parameter data in the configuration data structure upon detection of a change to the communication parameter data in a monitored location, to modify the communication parameter data used by the proxy server without restarting any subscriber service process or publisher service process.

The subscriber sidekick process may change the communication parameter data in the configuration data structure via a status port to change data in memory used by the proxy server to change the communication parameter data without modification to code of the publisher service or code of the subscriber service.

The monitored location may include a registry in a repository. The registry may include a key-value store. The subscriber sidekick process may monitor the monitored location by a watch registration from which a notification is received upon occurrence of a change. The subscriber sidekick process may monitor the monitored location in an out-of-band communication relative to the proxy server communication.

The proxy server may make health check requests to the publisher service instance. The data structure may include a declarative file and/or a memory. A publisher sidekick process may perform a health check of the publisher service instance.

One or more aspects are directed towards accessing configuration information in a memory by a proxy server of a subscriber service, the configuration information determining communication parameters for communication between a publisher service and the proxy server on behalf of the subscriber service. Described herein is detecting a change to the configuration information, and in response, changing the configuration information in the memory into modified configuration information. The proxy server continuing communication with the publisher service is based upon the modified configuration information, without stopping the subscriber service.

Also described herein is the ability to perform a health check of publisher service instance, if desired.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
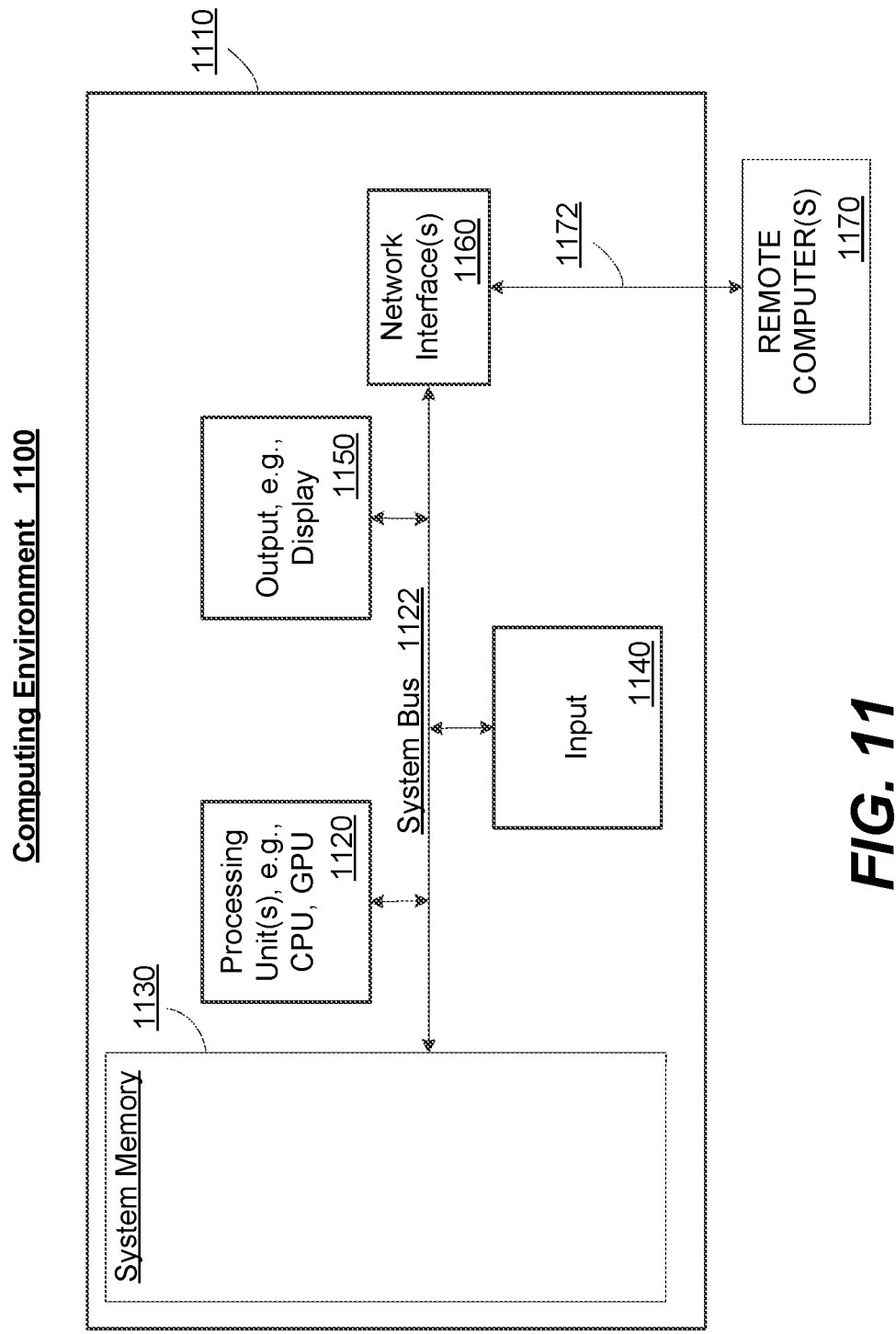
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system"

and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
using, by a proxy server operating on a subscriber server comprising a processor, configuration information to communicate between the proxy server and a publisher service operating on a publisher server, wherein the proxy server is coupled to a subscriber service operating on the subscriber server and communicates on behalf of the subscriber service;
detecting, by a subscriber sidekick process operating on the subscriber server, a state change related to the publisher service, in which the state change is indicated in a repository;
changing, by the subscriber sidekick process, the configuration information dynamically and in real time, based upon the state change, into modified configuration information; and
using, by the proxy server, the modified configuration information to communicate between the proxy server and the publisher service, in which the changes occur without modification to code of the publisher service or code of the subscriber service, and without restarting the proxy server.

2. The method of claim 1, wherein the changing the configuration information comprising communicating, by the subscriber sidekick process, with the proxy service via a status port, and without restarting any subscriber service process or publisher service process.

3. The method of claim 1, wherein the detecting the state change comprises monitoring the repository and receiving a notification corresponding to the state change.

4. The method of claim 3, wherein the monitoring the repository comprises using event messaging or long polling.

5. The method of claim 3, wherein the monitoring the repository comprises watching a key-value store coupled to or incorporated into the repository.

6. The method of claim 1, wherein the changing the configuration information comprising modifying, by the subscriber sidekick process, the configuration information in-memory via a status port.

7. The method of claim 1, further comprising, performing, by the subscriber sidekick process, a health check of one or more publisher service instances of the publisher service, and removing, by the proxy server, any publisher service instance that fails the heath check from a load balancer rotation of the one or more instances.

8. The method of claim 7, further comprising, changing, by the proxy server, any publisher service instance that fails the heath check into a maintenance mode.

9. A subscriber server device comprising:
a processor; and
a memory communicatively coupled to the processor, the memory having stored therein computer-executable components, comprising:
a subscriber service process;
a proxy server coupled to the subscriber service process, the proxy server configured to communicate with a publisher service process instance using communication parameter data in a configuration data structure stored in the memory; and
a subscriber sidekick process configured to change the communication parameter data in the configuration data structure stored in the memory upon detection of a change to the communication parameter data in a monitored location, to initiate the proxy server to employ the changed communication parameter data used by the proxy server without restarting any of the proxy server, the subscriber service process or the publisher service process.

10. The subscriber server device of claim 9, wherein the subscriber sidekick process changes the communication parameter data in the configuration data structure stored in the memory via a status port without modification to code of the publisher service process or code of the subscriber service process.

11. The subscriber server device of claim 9, wherein the monitored location comprises a registry in a repository.

12. The subscriber server device of claim 11, wherein the registry comprises a key-value store.

13. The subscriber server device of claim 9, wherein the subscriber sidekick process monitors the monitored location by a watch registration from which a notification is received upon occurrence of a change.

14. The subscriber server device of claim 9, wherein the subscriber sidekick process monitors the monitored location in an out-of-band communication relative to the proxy server communication.

15. The subscriber server device of claim 9, wherein the proxy server makes health check requests to the publisher service process instance.

16. The subscriber server device of claim 9, wherein the subscriber sidekick process is also configured to change a declarative file representative of the communication parameter data in the configuration data structure comprises a declarative file.

17. The subscriber server device of claim 9, wherein the proxy server receives, from a publisher sidekick process associated with the publisher service process instance, a health check state indication of the publisher service process instance.

18. A non-transitory computer-readable medium having instructions stored thereon that, in response to execution, cause a subscriber server including a processor to perform operations, the operations comprising:
  accessing configuration information in a memory of the subscriber server by a proxy server operating on the subscriber server, the configuration information determining communication parameters for communication between a publisher service and the proxy server on behalf of a subscriber service operating on the subscriber server;
  detecting, by a subscriber sidekick process operating on the subscriber server, a change to the configuration information, and in response, changing, by the subscriber sidekick process, the configuration information in the memory into modified configuration information; and
  the proxy server continuing communication with the publisher service based upon the modified configuration information without stopping the subscriber service and without restarting the proxy server.

19. The non-transitory computer-readable medium of claim 18, wherein the operations further comprise performing, by the subscriber sidekick process, a health check of the publisher service.

20. The non-transitory computer-readable medium of claim 19, wherein the operations further comprise removing, by the proxy server, the publisher service from a load balancer rotation in response to the publisher service failing the health check.

* * * * *